Aug. 17, 1943.  C. L. GARY ET AL  2,327,257
OPTICAL INSPECTION DEVICE
Filed Nov. 30, 1940

INVENTOR
CHARLES L. GARY
KENNARD W. HARPER
BY
ATTORNEY

Patented Aug. 17, 1943

2,327,257

UNITED STATES PATENT OFFICE 2,327,257

OPTICAL INSPECTION DEVICE

Charles L. Gary, Kenmore, and Kennard W. Harper, East Aurora, N. Y., assignors to Spencer Lens Company, Buffalo, N. Y., a corporation of New York Application November 30, 1940, Serial No. 367,988

4 Claims. (Cl. 88—14)

This invention relates to optical inspection apparatus and has particular reference to a device for the minute inspection of devices or portions thereof such as screw threads or the like.

An object of the invention is to provide new and improved apparatus for inspecting the surface of articles for minute conditions and the device may also be provided with means for comparing or measuring said surface conditions.

Another object of the invention is to provide a device which will allow the inspection of such conditions where the location thereof is such that it is difficult to see otherwise.

Another object of the invention is to provide a device of the type specified which is relatively simple and economical of construction and yet gives accurate results.

Another object of the invention is to provide a device of the type specified which is easily portable and which may be quickly and easily attached to or detached from an article to be inspected.

Other objects and advantages of the invention will be apparent from the following description taken in connection with the accompanying drawing, and it will be understood that many changes may be made in the details of construction and arrangement of parts without departing from the scope of the invention as set forth in the appended claims. We therefore do not wish to be limited to the exact details of construction and arrangement of parts shown and described as the preferred form has been shown by way of illustration only.

Referring to the drawing.

Figure 1:
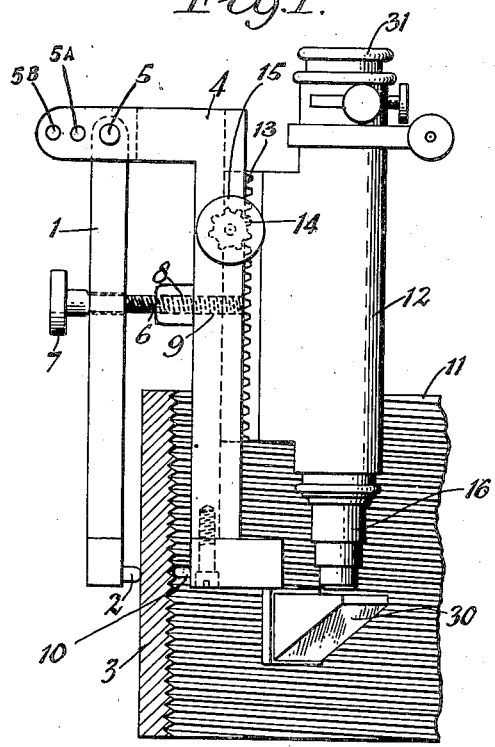
Fig. 1 is a side view of the device showing the same in use for inspecting the internal threads of a pipe.
Figure 2:
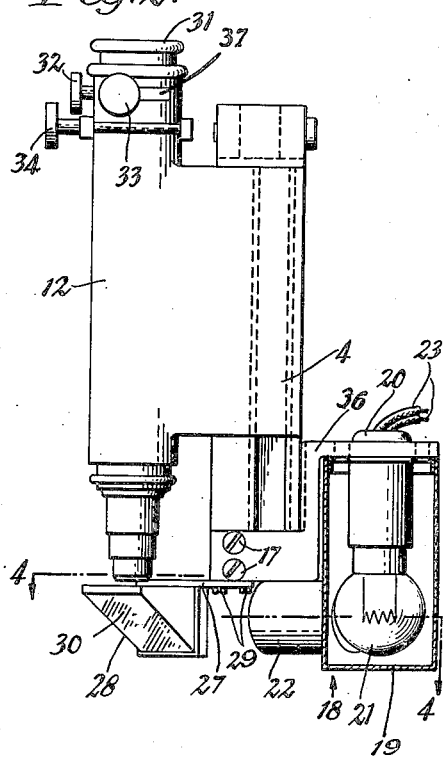
Fig. 2 is a front view of the device.

Referring more particularly to the drawing wherein similar reference characters designate corresponding parts throughout the several views, the device of the invention comprises the clamp member adapted to clamp the device in operable relation with the work to be inspected. The clamp member comprises the member 1 having the projections 2 adapted to engage the device such as the pipe 3 and the support member 4 which is pivoted to the member 1 by the pivot member 5. The device may be adapted for clamping or fastening on thicker articles by pivotally mounting the member 1 at the opening 5A or 5B in the arm 4 instead of at 5 as shown. There is provided a screw member 6 having the head 7 and having the threaded portion 8 adapted to engage the threaded opening 9 in the support 4. It will be apparent that by placing the object on which the instrument is to be supported between the projections 2 on the member 1 and the projection 10 on the member 4 and then tightening the screw 6, the instrument will be supported in desired relation with the work.

The pipe or the like 3 has the threads 11 which in the case shown are internal and therefore difficult to inspect, compare or measure without a device such as the present invention although the instrument could be employed with a device where the surface conditions which it is desired to inspect, measure or compare were external as well.

On the supporting portion 4 is mounted the microscope member 12 which by means of the rack 13 and pinion 14 is adapted to be moved through movement of the handle member 15 to raise or lower the microscope 12. This permits focussing the microscope on the area desired to be inspected. The microscope 12 has the usual microscope objective 16 at its lower end.

On the support 4 and adjacent its lower end is secured the bracket or arm 36, by means of the screws or the like 17, and supporting the illuminating member 18. This illuminating member or device comprises the lamp housing 19, lamp socket 20, lamp 21 and light tube 22. The current for the lamp 21 is provided through the wires 23.

The light tube 22 contains the condensing lens element 24, diaphragm 25 and focussing lens 26. The diaphragm 25 is preferably a glass disc having one-half thereof transparent and the other half translucent. While this arrangement of diaphragm is preferred it will be understood that the diaphragm may be constructed with a translucent background and a transparent slit or opening. Therefore the light projected on the work such as the screw threads will be either a vertical slit of light projected thereon crosswise or substantially perpendicular to the threads or a circular field of illumination one-half of which will be brighter than the other half and with the dividing line crosswise or perpendicular to the threads.

With the diaphragm half transparent and half translucent as described above, the half of the field which is transparent will be brightly illuminated and the half which is translucent will also be illuminated, but while not so bright as the field illuminated by the transparent half, yet the field will be bright enough to illuminate the pattern etched on the reticule in the eyepiece. Thus if the image of the thread or other object being inspected does not exactly coincide with the pattern etched on the reticule the illumination will allow the observer to see how much they differ.

The diaphragm 25 may be so constructed that it may be rotated to enable the lining up of the line dividing the two fields in desired relation with the object being inspected or compared. The focussing lens 26 may also be so mounted as to allow its adjustment for focussing an image of the reticule or diaphragm 25 on the threads or other objects being inspected or compared.

Also mounted on the support 4 adjacent its lower end is the prism or reflector support 27 containing the prism or reflector 28.

The member 27 is secured to the member 4 by the screws or the like 29.

It will be noted that while the bracket 36 is secured to the member 4 by the screws 17 and the member 27 is secured to the member 4 by the screws 29 that these parts could be secured by solder, welding or the like or could be formed integral as desired.

The prism or reflector 28 is so positioned as to reflect the light entering therein and impinging on the surface 30 up through the objective 16 and body portion of the microscope 12 into the eyepiece 31.

We have found that if the optical axis of the light source is set at an angle of 22½ degrees from a line normal to the surface being inspected, the angle between the said line and the optical axis of said reflector should be 45 degrees.

Where the angles are different from the above we have found that the necessary angles can be computed by setting the optical axis of the reflector at an angle to the said normal line, which angle is 90 degrees less twice the angle between the said normal line and the axis of said source of illumination.

Figure 4:
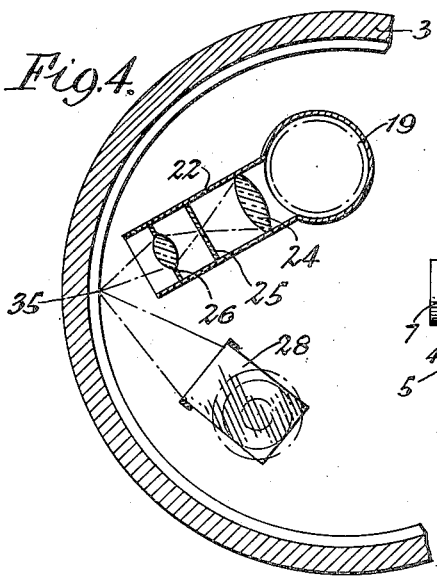
Fig. 4 is a sectional view taken on line 4—4 looking in the direction of the arrows.
Figure 3:
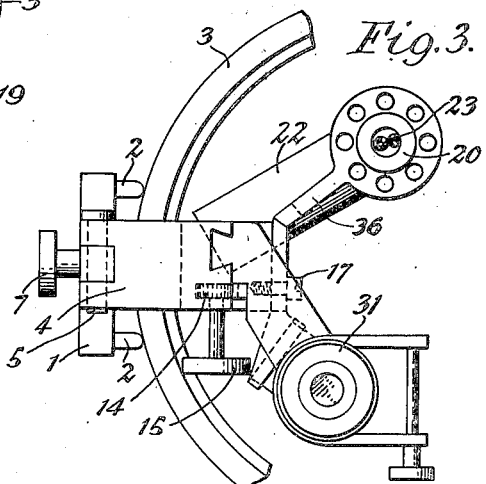
Fig. 3 is a top plan view thereof.

The light tube 22 is so positioned that it will direct a vertical slit of light onto the object to be examined as described above in such position that the portion of the object which is illuminated by the slit of light will be reflected into the reflector 28 and reflected by the surface 30 up through the objective 16 and body portion of the microscope as stated above. This is shown in detail in Fig. 4.

Adjacent the upper end of the microscope 12 is a recess or cell 37 for positioning a reticule, gage or the like for comparing or measuring conditions of the article being inspected, such as screw threads for example. The screws 32 and 33 are provided for adjusting the reticule or gage longitudinally or crosswise to align the same with the image of the threads which is seen through the microscope. In this way the reticule or gage can be aligned with the image seen through the microscope so that the image can be compared with the gage or measured as desired. If desired, the screws 32 and 33 may be provided with graduations or graduated dials which will allow measurement of the movement of the reticule and thereby allow measurement of the image.

The tangent screw 34 is provided to allow rotation of the reticule to orient the same to allow its being angularly aligned with the image seen through the microscope after which the screw 34 is tightened to lock the microscope in desired angular relation.

The microscope 12 contains the usual microscope optical arrangement, that is, the eyepiece and objective lens system which are of the usual microscope type.

The operation of the device is as follows:

The instrument is clamped in position on a pipe or similar article the surface of which it is desired to inspect by positioning the pipe or the like between the members 1 and 4 and tightening the screw 6 as described above. The lamp 21 is then illuminated and by means of the condensing lens 24, diaphragm 25 and projection lens 26 there is formed on the surface of the object a vertical slit of light as is shown at 35 in Fig. 4 or a circular field of light as described above. This illuminated slit or portion is picked up by the prism or reflector 28 and reflected by the surface 30 of said reflector 28 up through the objective 16 through the reticule and through the eyepiece 31 where it is seen by the operator or observer. The microscope is adjusted vertically by turning the knob 15 to bring the image of the illuminated portion into focus on the reticule. The reticule is adjusted by means of the screws 32, 33 and 34 to align the same with the image reflected through the microscope whereby the same may be compared or measured as desired.

From the foregoing it will be seen that we have shown simple, efficient and economical means for obtaining all of the objects and advantages of the invention.

We claim as our invention:

1. In a device of the character described for examining the interior surface of an article, a support, said support having a portion adapted to extend into the interior of an article, the interior surface of which is to be examined, a source of illumination and a reflector member adjacent the end of said support adapted to extend into the interior of said article, said light source being adapted to project a slit of light onto the surface to be examined, a microscope adjustably mounted on said support and in optical alignment with said reflector member, said reflector being adapted to reflect an image of the surface being examined into said microscope, a reticule in alignment with said microscope and means for rotating said reticule for aligning the same with the image of the object being examined.

2. In a deivce of the character described for examining the interior surface of an article, a support, means for removably securing said support on an article, said support having a portion adapted to extend into the interior of an article, the interior surface of which is to be examined, a source of illumination and a reflector member adjacent the end of said support adapted to extend into the interior of said article, said light source being adapted to project a slit of light onto the surface to be examined, a microscope adjustably mounted on said support and in optical alignment with said reflector member, said reflector being adapted to reflect an image of the surface being examined into said microscope, a reticule in alignment with said microscope and means for rotating said reticule for aligning the same with the image of the object being examined.

3. In a device of the character described for examining the interior surface of an article, a support, said support having a portion adapted to extend into the interior of an article the surface of which is to be examined, a light source and a reflector member on said support adjacent the end thereof adapted to extend into the interior of said article, said light source being adapted to project a slit of light onto the surface to be examined, a microscope adjustably mounted on said support and in optical alignment with said reflector member, said reflector being adapted to reflect an image of the surface being examined into said microscope, a gage member in alignment with said microscope and means on said microscope for adjusting said gage longitudinally and crosswise and means for angularly adjusting said gage for aligning the same with the image of the object being examined.

4. In a device of the character described for examining the interior surface of an article, a support, said support having a portion adapted to extend into the interior of an article the surface of which is to be examined, a light source and a reflector member on said support adjacent the end thereof adapted to extend into the interior of said article, said light source being adapted to project a slit of light onto the surface to be examined, a microscope adjustably mounted on said support and in optical alignment with said reflector member, said reflector being adapted to reflect an image of the surface being examined into said microscope, a gage member in alignment with said microscope and tangent screw means on said microscope for rotating said gage for aligning the same with the image of the object being examined.

CHARLES L. GARY.
KENNARD W. HARPER.